United States Patent
Ren et al.

(10) Patent No.: US 11,457,478 B2
(45) Date of Patent: Sep. 27, 2022

(54) METHOD AND DEVICE FOR RANDOM ACCESS

(71) Applicant: China Academy of Telecommunications Technology, Beijing (CN)

(72) Inventors: Bin Ren, Beijing (CN); Ren Da, Beijing (CN); Zheng Zhao, Beijing (CN); Tie Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 66 days.

(21) Appl. No.: 16/765,154

(22) PCT Filed: Oct. 10, 2018

(86) PCT No.: PCT/CN2018/109644
§ 371 (c)(1),
(2) Date: May 18, 2020

(87) PCT Pub. No.: WO2019/095890
PCT Pub. Date: May 23, 2019

(65) Prior Publication Data
US 2020/0344811 A1    Oct. 29, 2020

(30) Foreign Application Priority Data
Nov. 16, 2017    (CN) .......................... 201711140715.7

(51) Int. Cl.
*H04W 4/00*    (2018.01)
*H04W 74/08*    (2009.01)
(Continued)

(52) U.S. Cl.
CPC ..... *H04W 74/0833* (2013.01); *H04L 27/2601* (2013.01); *H04W 72/0446* (2013.01)

(58) Field of Classification Search
CPC .......... H04W 74/0833; H04W 72/0446; H04L 27/2601
See application file for complete search history.

(56) References Cited

U.S. PATENT DOCUMENTS

| 2018/0279380 A1* | 9/2018 | Jung | ................. | H04W 56/0005 |
| 2019/0274172 A1* | 9/2019 | Yoon | ................. | H04W 74/0833 |

FOREIGN PATENT DOCUMENTS

| CN | 101237313 A | 8/2008 |
| CN | 101426268 A | 5/2009 |

(Continued)

OTHER PUBLICATIONS

3GPP TSG RAN WG1 Meeting #90bis, PRACH formats and Resource Configuration, Oct. 9-13, 2017, R1-1717035 (Year: 2017).*

(Continued)

*Primary Examiner* — Siren Wei
(74) *Attorney, Agent, or Firm* — Kilpatrick Townsend & Stockton, LLP

(57) ABSTRACT

The present application relates to the field of wireless communications, and in particular, to a method and device for random access, for use in resolving the problem in the prior art of conflict between a time domain resource used by a terminal for random access and a time domain resource occupied for transmission of a SS Block and/or RMSI. In embodiments of the present application, a terminal determines a PRACH time domain resource configured by a base station for the terminal; when determining that at least one time slot comprises a first type of OFDM symbols used for transmission of a SS Block and/or RMSI, the terminal performs random access by means of OFDM symbols different from the first type of OFDM symbols in the at least one time slot. In the embodiments of the present application, the terminal performs random access by means of OFDM symbols different from the first type of OFDM symbols in (Continued)

the time slot, so that conflict between the time domain resource used for random access and the time domain resource occupied for transmission of the SS Block and/or RMSI is avoided, and the system performance is further improved.

10 Claims, 7 Drawing Sheets

(51) Int. Cl.
*H04L 27/26* (2006.01)
*H04W 72/04* (2009.01)

(56) References Cited

FOREIGN PATENT DOCUMENTS

| CN | 101868027 A | 10/2010 |
|----|-------------|---------|
| WO | 2014110714 A1 | 7/2014 |
| WO | 2017014715 A1 | 1/2017 |

OTHER PUBLICATIONS

ZTE et al.,"PRACH formats and Resource Configuration", 3GPP TSG RAN WG1 Meeting #90bis, Prague, Czech Republic, Oct. 9-13, 2017, total 9 pages, R1-1717035.

Samsung,"Discussion on RACH configuration", 3GPP TSG RAN WG1 Meeting 90bis, Prague, CZ, Oct. 9-13, 2017, total 4 pages, R1-1717588.

Catt,"Further details on NR RACH format", 3GPP TSG RAN WG1 Meeting #90bis, Prague, CZ, Oct. 9-13, 2017, total 11 pages, R1-1717802.

NTT Docomo, Inc.,"Discussion on remaining details on PRACH formats", 3GPP TSG RAN WG1 Meeting 90bis Prague, CZ, gth-13th, Oct. 2017, total 11 pages, R1-1718183.

ZTE et al., "Summary of PRACH Remaining details on PRACH formats", 3GPP TSG RAN WG1 Meeting 90bis, Prague, CZ, Oct. 9-13, 2017, total 29 pages, R1-1719175.

Qualcomm Incorporated "4-step RACH procedure consideration", 3GPP TSG-RAN WG1 #90 Prague, Czech Republic, May 15-19, 2017, total 15 pages, R1 -1713382.

3GPP TS 38.213 V1.0.0; 3rd Generation Partnership Project; Technical Specification Group Radio Access Network; NR; Physical layer procedures for control(Release 15); Sep. 2017; 16 pages.

Intel Corporation "Remaining details of PRACH formats", 3GPP TSG RAN WG1 #91bis Prague, Czech Republic, Oct. 9-13, 2017, total 5 pages, R1-1717357.

\* cited by examiner

METHOD AND DEVICE FOR RANDOM ACCESS

This application is a National Stage of International Application No. PCT/CN2018/109644, filed on Oct. 10, 2018, which claims priority to China Patent Application No. 201711140715.7, filed on Nov. 16, 2017 in China Patent Office and entitled "Method and Device for Random Access", both of which are hereby incorporated by reference in their entireties.

FIELD

The present application relates to the field of wireless communications, and in particular, to a random access method and device.

BACKGROUND

New Radio (NR) Rel-15 defines a Synchronization Signal Block (SS Block) that occupies 4 Orthogonal Frequency Division Multiplexing (OFDM) symbols, in an order of a Primary Synchronized Signal (PSS), A Physical Broadcast Channel (PBCH), A Secondary Synchronization Signal (SSS) and A PBCH, and supports 15/30/120/240 KHz Subcarrier Spacings (SCSs). A default cycle and a configuration cycle are supported. The default cycle is 20 ms, and is used for initial cell searching. The configuration cycle from 5 ms to 160 ms can be used in CONNECTED/IDLE and non-stand alone networking scenes. For the default cycle and the configuration cycle, all SS Blocks of an SS Block burst set are transmitted within 5 ms. The SS Blocks include candidate SS Blocks and actual SS Blocks. According to different frequency bands, the maximum number L of the candidate SS blocks of one SS Block burst set is different, and a base station selects actually transmitted SS Blocks from a candidate SS Block set according to an actual situation, that is, the number of actual SS Blocks can be less than or equal to L.

The first portion of minimum system information required for terminal retention, random access and other processes is transmitted by the PBCH, and the remaining portion is transmitted by using Remaining Minimum System Information (RMSI). The RMSI uses a Physical Downlink Shared Channel (PDSCH) scheduled by a Physical Downlink Control Channel (PDCCH) for transmission. In order to extend the coverage, a beam scanning method is also used. A control resource set (CORESET) corresponding to time and frequency resources where the RMSI PDCCH is located is configured by the PBCH. The RMSI and the SS Blocks can adopt Frequency Domain Multiplexing (FDM) and Time Domain Multiplexing (TDM) methods.

At present, for a Time Division Duplex (TDD) mode, in a random access process, a terminal performs, according to a Physical Random Access Channel (PRACH) time domain resource configured by the base station, random access through a time slot where the PRACH time domain resource is located. However, since the time slot used by the terminal for the random access may include a time domain resource occupied by a downlink channel for transmitting the SS Blocks and/or the RMSI, the time domain resource used by the terminal for the random access and the time domain resource occupied by the downlink channel for transmitting the SS Blocks and/or the RMSI may be conflicted.

SUMMARY

The embodiments of the present application provide a random access method and device to solve the problem that a time domain resource used by a terminal for random access and a time domain resource occupied by a downlink channel for transmitting Synchronization Signal Blocks (SS Blocks) and/or Remaining Minimum System Information (RMSI) may be conflicted in the prior art.

Based on the above problem, in a first aspect, the embodiment of the present application provides a random access method, including:

determining, by a terminal, a Physical Random Access Channel (PRACH) time domain resource configured by a base station for the terminal, and the PRACH time domain resource includes at least one time slot; and when it is determined that the at least one time slot includes a first type of Orthogonal Frequency Division Multiplexing (OFDM) symbols used for transmitting SS Blocks and/or RMSI, performing, by the terminal, random access through an OFDM symbol different from the first type of OFDM symbols in the at least one time slot.

In one embodiment, the performing, by the terminal, the random access according to any one of following manners:

Manner I, performing, by the terminal, the random access at a time slot which does not include the first type of OFDM symbols; and Manner II, performing, by the terminal, the random access through continuous OFDM symbols except the first type of OFDM symbols in the time slot including the first type of OFDM symbols.

In one embodiment, the terminal determines a random access manner according to followings:

determining, by the terminal, the random access manner according to a pre-configured rule; or receiving, by the terminal, an indication signaling transmitted by the base station through the RMSI, and determining the random access manner according to the indication signaling.

In one embodiment, before the performing, by the terminal, the random access through the continuous OFDM symbols except the first type of OFDM symbols in the time slot including the first type of OFDM symbols, the random access method further includes:

determining, by the terminal, that in the time slot including the first type of OFDM symbols, the quantity of remaining continuous OFDM symbols for uplink transmission except the first type of OFDM symbols is not less than the quantity of actually used OFDM symbols for the random access.

In one embodiment, the terminal determines the quantity of the remaining continuous OFDM symbols for uplink transmission according to followings:

determining, by the terminal, a ratio of a Subcarrier Spacing (SCS) of a PRACH configured by the base station to an SCS of an SS Block; and determining, by the terminal, a product of the quantity of remaining continuous OFDM symbols in the time slot including the first type of OFDM symbols and the ratio as the quantity of the remaining continuous OFDM symbols for uplink transmission.

In one embodiment, the performing, by the terminal, the random access through the continuous OFDM symbols except the first type of OFDM symbols in the time slot including the first type of OFDM symbols includes:

selecting, by the terminal, at least one idle OFDM symbol between the first type of OFDM symbols from the time slot including the first type of OFDM symbols, or at least one idle OFDM symbol at the end of the time slot including the first type of OFDM symbols; and performing, by the terminal, the random access through the selected OFDM symbol.

In a second aspect, the embodiment of the present application further provides a random access method, including:

configuring, by a base station, a Physical Random Access Channel (PRACH) time domain resource for a terminal, and the PRACH time domain resource includes at least one time slot; and when it is determined that the at least one time slot includes a first type of Orthogonal Frequency Division Multiplexing (OFDM) symbols used for transmitting SS Blocks and/or RMSI, receiving and detecting, by the base station, the PRACH on an OFDM symbol different from the first type of OFDM symbols in the at least one time slot.

In one embodiment, the receiving and detecting, by the base station, the PRACH according to any one of following manners:

Manner I, receiving and detecting, by the base station, the PRACH at a time slot which does not include the first type of OFDM symbols; and Manner II, receiving and detecting, by the base station, the PRACH on continuous OFDM symbols except the first type of OFDM symbols in the time slot including the first type of OFDM symbols.

In one embodiment, before the receiving and detecting, by the base station, the PRACH on the continuous OFDM symbols except the first type of OFDM symbols in the time slot including the first type of OFDM symbols, the random access method further includes:

determining, by the base station, that in the time slot including the first type of OFDM symbols, the quantity of remaining continuous OFDM symbols for uplink transmission except the first type of OFDM symbols is not less than the quantity of actually used OFDM symbols for the random access.

In one embodiment, the base station determines the quantity of the remaining continuous OFDM symbols for uplink transmission according to the following manners:

determining, by the base station, a ratio of a Subcarrier Spacing (SCS) of a PRACH configured for the terminal to an SCS of an SS Block; and determining, by the base station, a product of the quantity of remaining continuous OFDM symbols in the time slot including the first type of OFDM symbols and the ratio as the quantity of the remaining continuous OFDM symbols for uplink transmission.

In one embodiment, the receiving and detecting, by the base station, the PRACH on the continuous OFDM symbols except the first type of OFDM symbols in the time slot including the first type of OFDM symbols includes:

selecting, by the base station, at least one idle OFDM symbol between the first type of OFDM symbols from the time slot including the first type of OFDM symbols, or at least one idle OFDM symbol at the end of the time slot including the first type of OFDM symbols; and receiving and detecting, by the base station, the PRACH on selected OFDM symbol.

In a third aspect, the embodiment of the present application provides a terminal, including a processor, a memory, and a transceiver.

The processor is configured to read a program in the memory to perform followings:

determining a Physical Random Access Channel (PRACH) time domain resource configured by a base station for the terminal, and the PRACH time domain resource includes at least one time slot; and when it is determined that the at least one time slot includes a first type of Orthogonal Frequency Division Multiplexing (OFDM) symbols used for transmitting SS Blocks and/or RMSI, performing random access through an OFDM symbol different from the first type of OFDM symbols in the at least one time slot.

In one embodiment, the processor is configured to perform the random access according to any one of following manners:

Manner I, performing the random access at a time slot which does not include the first type of OFDM symbols; and Manner II, performing the random access through continuous OFDM symbols except the first type of OFDM symbols in the time slot including the first type of OFDM symbols.

In one embodiment, the processor is configured to determine a random access manner according to followings:

determining the random access manner according to a pre-configured rule; or receiving an indication signaling transmitted by the base station through the RMSI, and determining the random access manner according to the indication signaling.

In one embodiment, the processor is further configured to before performing the random access through the continuous OFDM symbols except the first type of OFDM symbols in the time slot including the first type of OFDM symbols, determine that in the time slot including the first type of OFDM symbols, the quantity of remaining continuous OFDM symbols for uplink transmission except the first type of OFDM symbols is not less than the quantity of actually used OFDM symbols for the random access.

In one embodiment, the processor is configured to determine the quantity of the remaining continuous OFDM symbols for uplink transmission according to followings:

determining a ratio of a Subcarrier Spacing (SCS) of a PRACH configured by the base station to an SCS of an SS Block; and determining a product of the quantity of remaining continuous OFDM symbols in the time slot including the first type of OFDM symbols and the ratio as the quantity of the remaining continuous OFDM symbols for uplink transmission.

In one embodiment, the processor is configured to select at least one idle OFDM symbol between the first type of OFDM symbols from the time slot including the first type of OFDM symbols, or at least one idle OFDM symbol at the end of the time slot including the first type of OFDM symbols; and perform the random access through the selected OFDM symbol.

In a fourth aspect, the embodiment of the present application provides a base station, including a processor, a memory, and a transceiver.

The processor is configured to read a program in the memory to perform followings:

configuring a Physical Random Access Channel (PRACH) time domain resource for a terminal, and the PRACH time domain resource includes at least one time slot; and when it is determined that the at least one time slot includes a first type of Orthogonal Frequency Division Multiplexing (OFDM) symbols used for transmitting SS Blocks and/or RMSI, receiving and detecting the PRACH on an OFDM symbol different from the first type of OFDM symbols in the at least one time slot.

In one embodiment, the processor is configured to receive and detect the PRACH according to any one of followings:

Manner I, receiving and detecting the PRACH at a time slot which does not include the first type of OFDM symbols; and Manner II, receiving and detecting the PRACH on continuous OFDM symbols except the first type of OFDM symbols in the time slot including the first type of OFDM symbols.

In one embodiment, the processor is further configured to before receiving and detecting the PRACH on the OFDM symbols except the first type of OFDM symbols in the time slot including the first type of OFDM symbols, determine that in the time slot including the first type of OFDM symbols, the quantity of remaining continuous OFDM symbols for uplink transmission except the first type of OFDM symbols is not less than the quantity of actually used OFDM symbols for the random access.

In one embodiment, the processor is configured to determine the quantity of the remaining continuous OFDM symbols for uplink transmission according to followings:

determining a ratio of a Subcarrier Spacing (SCS) of the PRACH configured for the terminal to an SCS of an SS Block, and determining a product of the quantity of remaining continuous OFDM symbols in the time slot including the first type of OFDM symbols and the ratio as the quantity of the remaining continuous OFDM symbols for uplink transmission.

In one embodiment, the processor is In one embodiment configured to select at least one idle OFDM symbol between the first type of OFDM symbols from the time slot including the first type of OFDM symbols, or at least one idle OFDM symbol at the end of the time slot including the first type of OFDM symbols; and receive and detect the PRACH on the selected OFDM symbol.

In a fifth aspect, the embodiment of the present application further provides a random access device, including:

a determining module configured to determine a Physical Random Access Channel (PRACH) time domain resource configured by a base station for a terminal, and the PRACH time domain resource includes at least one time slot; and a transmitting module configured to perform random access through an Orthogonal Frequency Division Multiplexing (OFDM) symbol different from a first type of OFDM symbols in the at least one time slot when it is determined that the at least one time slot includes the first type of OFDM symbols used for transmitting SS Blocks and/or RMSI.

In a sixth aspect, the embodiment of the present application provides a random access device, including:

a configuring module configured to configure a Physical Random Access Channel (PRACH) time domain resource for a terminal, and the PRACH time domain resource includes at least one time slot; and a receiving module configured to receive and detect the PRACH on an Orthogonal Frequency Division Multiplexing (OFDM) symbol different from a first type of OFDM symbols in the at least one time slot when it is determined that the at least one time slot includes the first type of OFDM symbols used for transmitting SS Blocks and/or RMSI.

In a seventh aspect, the embodiment of the present application provides a computer storage medium storing a computer program. The program, when executed by a processor, implements the steps implemented by a terminal, or the steps implemented by a base station.

According to the embodiments of the present application, during the random access, the terminal acquires the PRACH time domain resource configured by the base station; since the time domain resource includes at least one time slot, before the terminal transmits a random access preamble to the base station, the terminal firstly determines whether the at least one time slot configured by the base station includes the first type of OFDM symbols used for transmitting the SS Blocks and/or the RMSI. If the time slot includes the first type of OFDM symbols, the terminal performs the random access through the OFDM symbol different from the first type of OFDM symbols in the at least one time slot, so that the terminal avoids a conflict between a resource used for the random access and a resource occupied by a downlink channel for transmitting the SS Blocks and/or the RMSI, and the system performance is further improved.

BRIEF DESCRIPTION OF THE DRAWINGS

The accompanying drawings described here are used to provide a further understanding of the present application and form a part of the present application. The schematic embodiments and descriptions of the present application are used to explain the present application and do not constitute an improper limitation on the present application. In the drawings.

DETAILED DESCRIPTION OF THE EMBODIMENTS (1) In the embodiments of the present application, the nouns "network" and "system" are often used interchangeably.

(2) In the embodiments of the present application, the term "plurality" refers to two or more, and other quantifiers are similar.

(3) "And/or", describing the relationship of related objects, indicates that there can be three types of relationships, for example, A and/or B, which can indicate: A exists alone, A and B exist at the same time, and B exists alone. The character "/" generally indicates that the front and back related objects are in an "or" relationship.

The present application will be described in further detail below with reference to the accompanying drawings.

Figure 1:
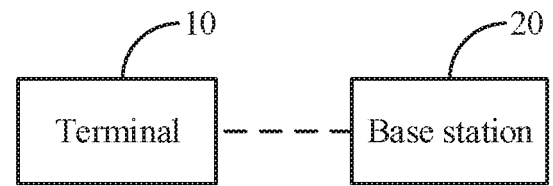
FIG. 1 is a schematic structural diagram of a random access system according to the embodiment of the present application.

As shown in FIG. 1, a random access system according to an embodiment of the present application includes: a terminal 10 and a base station 20.

The terminal 10 is configured to acquire a Physical Random Access Channel (PRACH) time domain resource configured by the base station for the terminal, and the PRACH time domain resource includes at least one time slot; and perform random access through an Orthogonal Frequency Division Multiplexing (OFDM) symbol different from a first type of OFDM symbols in the at least one time slot when it is determined that the at least one time slot includes the first type of OFDM symbols used for transmitting Synchronization Signal Blocks (SS Block) and/or Remaining Minimum System Information (RMSI).

The base station 20 is configured to acquire the PRACH time domain resource configured for the terminal, and the PRACH time domain resource includes at least one time slot; and receive and detect the PRACH on the OFDM symbol different from the first type of OFDM symbols in the at least one time slot when it is determined that the at least one time slot includes the first type of OFDM symbols used for transmitting the SS Blocks and/or the RMSI.

According to the embodiments of the present application, during the random access, the terminal acquires the PRACH time domain resource configured by the base station; and since the time domain resource includes at least one time slot, before the terminal transmits a random access preamble to the base station, the terminal firstly determines whether the at least one time slot configured by the base station includes the first type of OFDM symbols used for transmitting the SS Blocks and/or the RMSI. If the time slot includes the first type of OFDM symbols, the terminal performs the random access through the OFDM symbol different from the first type of OFDM symbols in the at least one time slot, so that the terminal avoids a conflict between a resource used for the random access and a resource occupied by a downlink channel for transmitting the SS Blocks and/or the RMSI, and the system performance is further improved.

The dimension of the PRACH resource of the embodiment of the present application includes: a time domain, a frequency domain and a code domain.

The definition of the PRACH time domain resource depends on a radio frame, a sub-frame, a time slot and an OFDM symbol corresponding to a PRACH format. One radio frame includes 10 sub-frames (1 ms), and one sub-frame includes one or more time slots. When a Subcarrier Spacing (SCS) is 15 KHz, one time slot is included. When the SCS is 30/60/120 KHz, 2/4/8 time slots are respectively included.

The PRACH time domain resource configured by the base station of the embodiment of the present application for the terminal at least indicates the time slot. In one embodiment, the PRACH time domain resource includes at least one time slot.

Before the terminal performs the random access by using the PRACH time domain resource configured by the base station, whether the at least one time slot configured by the base station includes the first type of OFDM symbols for transmitting the SS Blocks and/or the RMSI is determined.

If YES, the terminal performs the random access through the OFDM symbol different from the first type of OFDM symbols in the at least one time slot. If NO, the terminal selects a required OFDM symbol according to a configured PRACH format and a start OFDM symbol position in the whole time slot configured by the base station, and performs the random access in combination with a frequency domain resource configured by the base station.

Correspondingly, before the base station receives and detects the PRACH, whether the at least one time slot configured for the terminal includes the first type of OFDM symbols for transmitting the SS Blocks and/or the RMSI or not is determined.

If YES, the base station receives and detects the PRACH on the OFDM symbol different from the first type of OFDM symbols in the at least one time slot. If NO, the base station selects an OFDM symbol to be detected according to the configured PRACH format and the start OFDM symbol position in the whole time slot configured for the terminal, and receives and detects the PRACH in combination with the frequency domain resource configured by the base station.

In one embodiment, the terminal performs the random access according to any one of the following manners when it is determined that the at least one time slot includes the first type of OFDM symbols used for transmitting the SS Blocks and/or the RMSI.

Manner I, the terminal performs the random access at a time slot which does not include the first type of OFDM symbols.

Correspondingly, the base station receives and detects the PRACH at the time slot which does not include the first type of OFDM symbols.

When Manner I is used, the terminal may only perform the random access through the time slot which does not include the first type of OFDM symbols. If the PRACH time domain resource currently configured by the base station for the terminal does not have the time slot which does not include the first type of OFDM symbols, the terminal does not perform the random access within this PRACH transmission cycle, and waits for the next PRACH transmission cycle.

Correspondingly, the base station may only receive and detect the PRACH through the time slot which does not include the first type of OFDM symbols. If the currently configured PRACH does not have the time slot which does not include the first type OFDM symbols, the base station does not receive and detect the PRACH within this PRACH transmission cycle, and waits for the next PRACH transmission cycle.

Manner II, the terminal performs the random access through continuous OFDM symbols except the first type of OFDM symbols in the time slot including the first type of OFDM symbols.

Correspondingly, the base station receives and detects the PRACH on the continuous OFDM symbols except the first type of OFDM symbols in the time slot including the first type of OFDM symbols.

The two manners are described in detail below.

Case I, the terminal performs the random access at a time slot which does not include the first type of OFDM symbols.

Correspondingly, the base station performs the random access at the time slot which does not include the first type of OFDM symbols.

The terminal may determine a random access manner according to the following manners.

The random access manner may be Manner I or Manner II.

(I) The terminal determines the random access manner according to a pre-configured rule.

Correspondingly, the base station determines the PRACH receiving and detection manner according to the pre-configured rule.

It should be noted that the pre-configured rule may be protocol pre-definition, and is pre-configured to the terminal and the base station.

(II) The terminal receives an indication signaling transmitted by the base station through the RMSI, and determines the random access manner according to the indication signaling.

Correspondingly, the base station determines the manner that the terminal performs the random access according to information such as a cell radius and a cell load, and informs the manner that the terminal performs the random access to the terminal by means of the indication signaling. In one embodiment, the indication signaling is carried in the RMSI.

The random access manner corresponding to Case I is described in detail below.

1. The PRACH time domain resource configured by the base station for the terminal includes one time slot.

The terminal determines whether the current time slot includes the first type of OFDM symbols. If NO, the terminal performs the random access in this time slot. If NO, the terminal does not perform the random access within this PRACH transmission cycle, and waits for the next PRACH transmission cycle for determination again.

Correspondingly, the base station determines whether the current time slot includes the first type of OFDM symbols. If NO, the base station receives and detects the PRACH in this time slot. If YES, the base station does not receive and detect the PRACH within this PRACH transmission cycle, and waits for the next PRACH transmission cycle for determination again.

2. The PRACH time domain resource configured by the base station for the terminal includes a plurality of time slots.

The terminal determines whether the current time slot includes the first type of OFDM symbols. If NO, the terminal performs the random access in this time slot. If YES, the terminal determines whether the next time slot in the plurality of configured time slots includes the first type of OFDM symbols until a time slot which does not include the first type of OFDM symbols is determined, and performs the random access in the time slot which does not include the first type of OFDM symbols. If the plurality of configured time slots all include the first type of OFDM symbols, the terminal does not perform the random access within this PRACH transmission cycle, and waits for the next PRACH transmission cycle for determination again.

Correspondingly, the base station determines whether the current time slot includes the first type of OFDM symbols. If NO, the base station receives and detects the PRACH in this time slot. If YES, the base station determines whether the next time slot in the plurality of time slots configured for the terminal includes the first type of OFDM symbols until a time slot which does not include the first type of OFDM symbols is determined, and receives and detects the PRACH in the time slot which does not include the first type of OFDM symbols. If the plurality of configured time slots all include the first type of OFDM symbols, the base station does not receive and detect the PRACH within this PRACH transmission cycle, and waits for the next PRACH transmission cycle for determination again.

It should be noted that when the terminal performs the random access in the time slot which does not include the first type of OFDM symbols, a specific random access method may use a method in the prior art, and no details will be described here.

Similarly, when the base station receives and detects the PRACH in the time slot which does not include the first type of OFDM symbols, a specific PRACH receiving and detection method may use a method in the prior art, and no details will be described here.

Case II, the terminal performs the random access on the continuous OFDM symbols except the first type of OFDM symbols in the time slot including the first type of OFDM symbols, or performs the random access in the time slot which does not include the first type of OFDM symbols.

Correspondingly, the base station receives and detects the PRACH on the continuous OFDM symbols except the first type of OFDM symbols in the time slot including the first type of OFDM symbols, or receives and detects the PRACH in the time slot which does not include the first type of OFDM symbols.

It should be noted that in Case II, the terminal may perform the random access in any manner, and correspondingly, the base station may receive and detect the PRACH in any manner.

The terminal may determine a random access manner according to the following manners.

The random access manner may be Manner I or Manner II.

(I) The terminal determines the random access manner according to a pre-configured rule.

Correspondingly, the base station determines the PRACH receiving and detection manner according to the pre-configured rule.

It should be noted that the pre-configured rule may be protocol pre-definition, and is pre-configured to the terminal and the base station.

(II) The terminal receives an indication signaling transmitted by the base station through the RMSI, and determines the random access manner according to the indication signaling.

Correspondingly, the base station determines the manner that the terminal performs the random access according to information such as a cell radius and a cell load, and informs the manner that the terminal performs the random access to the terminal by means of the indication signaling. In one embodiment, the indication signaling is carried in the RMSI.

Before the terminal performs the random access on the continuous OFDM symbols except the first type of OFDM symbols in the time slot including the first type of OFDM symbols, the terminal needs to determine whether the time slot including the first type of OFDM symbols satisfies a condition.

In one embodiment, the terminal determines that in the time slot including the first type of OFDM symbols, the number of remaining continuous OFDM symbols for uplink transmission except the first type of OFDM symbols is not less than the number of actually used OFDM symbols for the random access.

The number of actually used OFDM symbols for the random access is equal to the number of OFDM symbols included in the PRACH format configured by the base station for the terminal.

In one time slot, the number of the remaining continuous symbols refers to a maximum number of continuous OFDM symbols except OFDM symbols occupied by a downlink channel and a signal, the number of remaining continuous OFDM symbols is calculated according to a Subcarrier Spacing (SCS) of the downlink channel and the signal, and a duration of the continuous OFDM symbols used for uplink random access transmission is calculated according to an SCS of an uplink PRACH format, so that the number of continuous OFDM symbols actually available for the uplink random access is calculated according to a ratio relation between the uplink SCS and the downlink SCS.

In one embodiment, the terminal determines the number of the remaining continuous OFDM symbols for uplink transmission according to the following manners.

The terminal determines a ratio of an SCS of a PRACH configured by the base station to an SCS of an SS Block. The terminal determines a product of the number of remaining continuous OFDM symbols in the time slot including the first type of OFDM symbols and the ratio as the number of the remaining continuous OFDM symbols for uplink transmission.

Correspondingly, before the base station receives and detects the PRACH on the OFDM symbols except the first type of OFDM symbols in the time slot including the first type of OFDM symbols, the base station also needs to determine whether the time slot including the first type of OFDM symbols satisfies a condition.

The base station determines that in the time slot including the first type of OFDM symbols, the number of the remaining continuous OFDM symbols for uplink transmission except the first type of OFDM symbols is not less than the number of actually used OFDM symbols for the random access.

The number of the actually used OFDM symbols for the random access is equal to the number of OFDM symbols included in the PRACH format configured by the base station for the terminal.

In one time slot, the number of the remaining continuous symbols refers to a maximum number of continuous OFDM symbols except OFDM symbols occupied by a downlink channel and a signal, the number of remaining continuous OFDM symbols is calculated according to a Subcarrier Spacing (SCS) of the downlink channel and the signal, and a duration of the continuous OFDM symbols used for uplink random access transmission is calculated according to an SCS of an uplink PRACH format, so that the number of continuous OFDM symbols actually available for the uplink random access is calculated according to a ratio relation between the uplink SCS and the downlink SCS.

In one embodiment, the base station determines the number of the remaining continuous OFDM symbols for uplink transmission according to the following manners.

The base station determines a ratio of an SCS of a PRACH configured for the terminal to an SCS of an SS Block. The base station determines a product of the number of remaining continuous OFDM symbols in the time slot including the first type of OFDM symbols and the ratio as the number of the remaining continuous OFDM symbols for uplink transmission.

It should be noted that the methods used by the terminal and the base station to determine the number of the remaining continuous OFDM symbols for the uplink transmission are the same.

The following several specific examples illustrate that the method for determining the number of the remaining continuous OFDM symbols for the uplink transmission is also applicable to the terminal and the base station.

It is defined that the number of the remaining continuous OFDM symbols in one time slot is T1. The number of the remaining continuous OFDM symbols is a maximum number of the continuous OFDM symbols except the OFDM symbols occupied by the downlink channel and the signal in the time slot. It is defined that the number of the remaining continuous OFDM symbols for the uplink transmission is T2. The SS Block for downlink transmission is taken as an example for illustration. The SCS of the SS Block may be 15 KHz, 30 KHz, 120 KHz, and 240 KHz, and the SCS of the PRACH for uplink transmission may be 15 KHz, 30 KHz, 60 KHz, and 120 KHz. The ratio of the SCS of the PRACH to the SCS of the SS Block is defined.

The following formula (1) provides a relation of T2, T1, and ratio:

$$T2 = T1 * ratio \qquad \text{FORMULA (1).}$$

Example 1: SCS (SS Block)=30 KHz, SCS (SS PRACH)=60 KHz, the ratio of the SCS of the PRACH to the SCS of the SS Block is equal to 2, and T2=T1*ratio=T1*2.

Example 2: SCS (SS Block)=30 KHz, SCS (SS PRACH)=15 KHz, the ratio of the SCS of the PRACH to the SCS of the SS Block is equal to ½, and T2=T1*ratio=T1*½.

Example 3: SCS (SS Block)=240 KHz, SCS (SS PRACH)=120 KHz, the ratio of the SCS of the PRACH to the SCS of the SS Block is equal to ½, and T2=T1*ratio=T1*½.

Example 4: SCS (SS Block)=15 KHz, SCS (PRACH) 30 KHz, the ratio of the SCS of the PRACH to the SCS of the SS Block is equal to 2, and T2=T1*ratio=T1*2.

Figure 2:
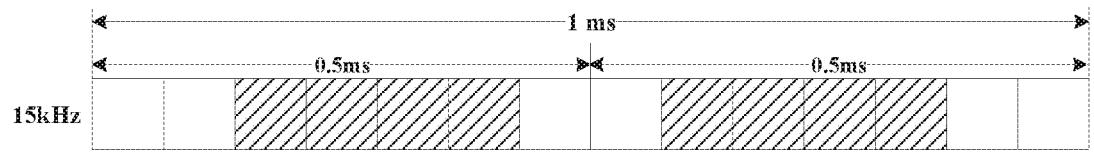
FIG. 2 is a schematic diagram of a first time slot according to the embodiment of the present application.

For example, for the time slots as shown in FIG. 2, a duration of one time slot is 1 ms, the time slot includes 14 OFDM symbols, so the SCS of the SS Block for the downlink transmission is 15 KHz. Two SS Blocks are respectively transmitted from symbol 2 to symbol 5 and from symbol 8 to symbol 11. Two continuous OFDM symbols are reserved between the two SS Blocks, and two continuous OFDM symbols are also reserved at the end of the time slot. Therefore, the number T1 of remaining continuous OFDM symbols in the current time slot is equal to 2.

If the SCS of the PRACH format configured by the base station is 30 KHz, the number T2 of the remaining continuous OFDM symbols for uplink transmission is equal to T1*2=4.

If the number of the OFDM symbols included in the PRACH format configured by the base station for the terminal is not greater than 4, the terminal may perform the random access in this time slot. If the number of the OFDM symbols included in the PRACH format configured by the base station for the terminal is greater than 4, the terminal may not perform the random access in this time slot.

According to the embodiment of the present application, after it is determined that the terminal may perform the random access through the OFDM symbols except the first type of OFDM symbols in the time slot including the first type of OFDM symbols, the terminal may perform the random access through the continuous OFDM symbols except the first type of OFDM symbols in the time slot including the first type of OFDM symbols by using the following manners.

The terminal selects at least one idle OFDM symbol between the first type of OFDM symbols from the time slot including the first type of OFDM symbols, or at least one idle OFDM symbol at the end of the time slot including the first type of OFDM symbols, and the terminal performs the random access through the selected OFDM symbol.

Correspondingly, after it is determined that the base station may receive and detect the PRACH through the OFDM symbols except the first type of OFDM symbols in the time slot including the first type of OFDM symbols, the base station may receive and detect the PRACH through the continuous OFDM symbols except the first type of OFDM symbols in the time slot including the first type of OFDM symbols by using the following manners.

The base station selects at least one idle OFDM symbol between the first type of OFDM symbols from the time slot including the first type of OFDM symbols, or at least one idle OFDM symbol at the end of the time slot including the first type of OFDM symbols, and the base station receives and detects the PRACH on the selected OFDM symbol.

The following describes, by several specific examples, the method that the terminal performs the random access through the continuous OFDM symbols except the first type of OFDM symbols in the time slot including the first type of OFDM symbols.

EXAMPLE I

Figure 3A:
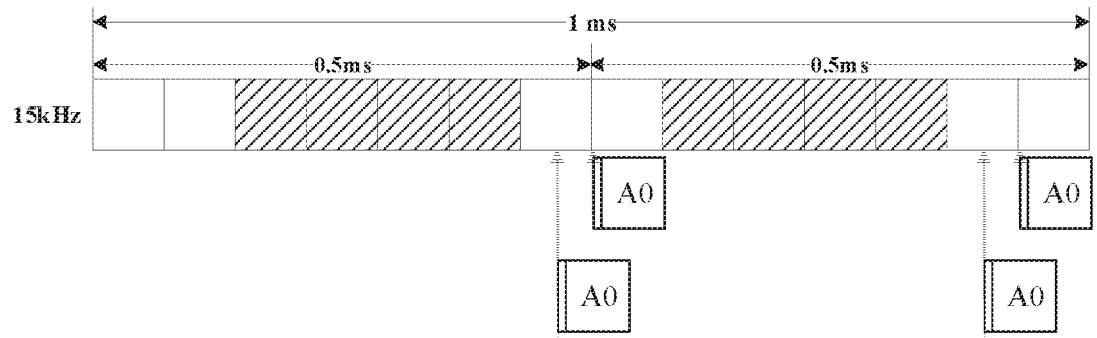
FIG. 3A is a schematic diagram of a second time slot according to the embodiment of the present application.

For the time slots as shown in FIG. 3A, a duration of one time slot is 1 ms, the time slot includes 14 OFDM symbols. Two SS Blocks are respectively transmitted from symbol 2 to symbol 5 and from symbol 8 to symbol 11. Two continuous OFDM symbols are reserved between the two SS Blocks, and two continuous OFDM symbols are also reserved at the end of the time slot. Therefore, the number T1 of remaining continuous OFDM symbols in the current time slot is equal to 2.

Whether the time slot may be used for the random access is determined below.

The terminal calculates the number of the remaining continuous OFDM symbols for the uplink transmission, and compares the calculated number of the remaining continuous OFDM symbols for the uplink transmission with the number of the OFDM symbols actually used for the random access.

If the SCS of the SS Block and the SCS of the PRACH format are both equal to 15 KHz, the ratio of the SCS of the PRACH to the SCS of the SS Block is equal to 1, and the number of the remaining continuous OFDM symbols for the uplink transmission is T2=T1*ratio=2.

If the number of OFDMs of the PRACH format configured by the base station is not greater than 2, the terminal may perform the random access in the time slot as shown in FIG. 3A. For example, the SCS of the PRACH is 15 KHz, and the PRACH format is A0 or C0. A0 is taken as an example in FIG. 3A. The terminal reserves two continuous OFDM symbols for transmission of a random access preamble between two SS Blocks, or reserves two continuous OFDM symbols for transmission of the random access preamble at the end of the time slot. A fixed transmission start position is at a start position of the first OFDM symbol or at a fixed offset position, and offset is equal to 0 us or T_ofdm/2, and T_ofdm represents the length of an OFDM symbol.

If the number of OFDMs of the PRACH format configured by the base station is not greater than 2, the terminal may not transmit the random access preamble in the time slot as shown in FIG. 3A.

EXAMPLE II

Figure 3B:
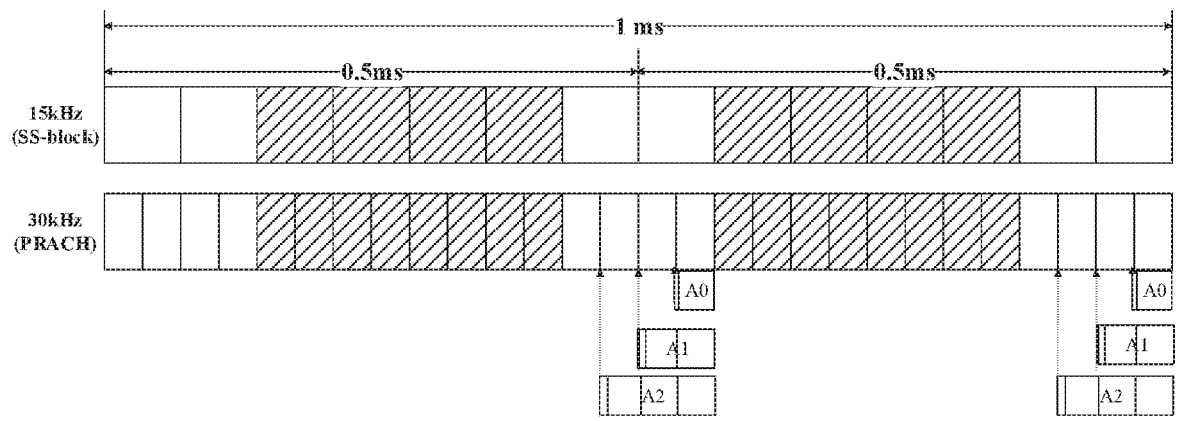
FIG. 3B is a schematic diagram of a third time slot according to the embodiment of the present application.

For the time slots as shown in FIG. 3B, a duration of one time slot is 1 ms, the SCS of the SS Block for the downlink transmission is 15 KHz, and totally 14 OFDM symbols are included. Two SS Blocks are respectively transmitted from symbol 2 to symbol 5 and from symbol 8 to symbol 11. Two continuous OFDM symbols are reserved between the two SS Blocks, and two continuous OFDM symbols are also reserved at the end of the time slot. Therefore, the number T1 of the remaining continuous OFDM symbols in the current time slot is equal to 2.

Whether the time slot may be used for the random access is determined below.

The terminal calculates the number of the remaining continuous OFDM symbols for the uplink transmission, and compares the calculated number of the remaining continuous OFDM symbols for the uplink transmission with the number of the OFDM symbols actually used for the random access.

As shown in FIG. 3B, if the SCS of the PRACH format configured by the base station for the terminal is equal to 30 KHz, the ratio of the SCS of the PRACH format to the SCS of the SS Block is equal to 2, the number of the remaining continuous OFDM symbols for the uplink transmission is T2=T1*ratio=4.

When the PRACH format configured by the base station is A0, A1, A2, B1, B2, C0, and C2, if the number of OFDMs included in the PRACH format is not greater than 4, the terminal may perform the random access in the time slot as shown in FIG. 3B. For example, the PRACH format being A0, A1, and A2 is taken as an example. The terminal uses the manner as shown in FIG. 3B during the random access the four remaining continuous OFDM symbols for the uplink transmission between the two SS Blocks of the terminal transmit the random access preamble, or the four remaining continuous OFDM symbols for the uplink transmission at the end of the time slot transmit the random access preamble, and the fixed transmission start position is a start position of the first OFDM symbol or at a fixed offset position, and offset is equal to 0 us or T_ofdm/2, and T_ofdm represents the length of an OFDM symbol.

If the number of OFDMs of the PRACH format configured by the base station is not greater than 4, the random access preamble may not be transmitted on the OFDM symbol of the time slot.

The terminal may use the following two manners when performing the random access with the manner of Case II.

Manner 1, the terminal performs the random access on the continuous OFDM symbols except the first type of OFDM symbols in the time slot including the first type of OFDM symbols.

Manner 2, the terminal performs the random access at a time slot which does not include the first type of OFDM symbols.

During the random access, the terminal may use any one of the above Manner 1 and Manner 2.

Correspondingly, the base station may receive and detection the PRACH by using the following two manners.

The base station receives and detects the PRACH on the continuous OFDM symbols except the first type of OFDM symbols in the time slot including the first type of OFDM symbols, or receives and detects the PRACH in the time slot which does not include the first type of OFDM symbols.

Figure 4:
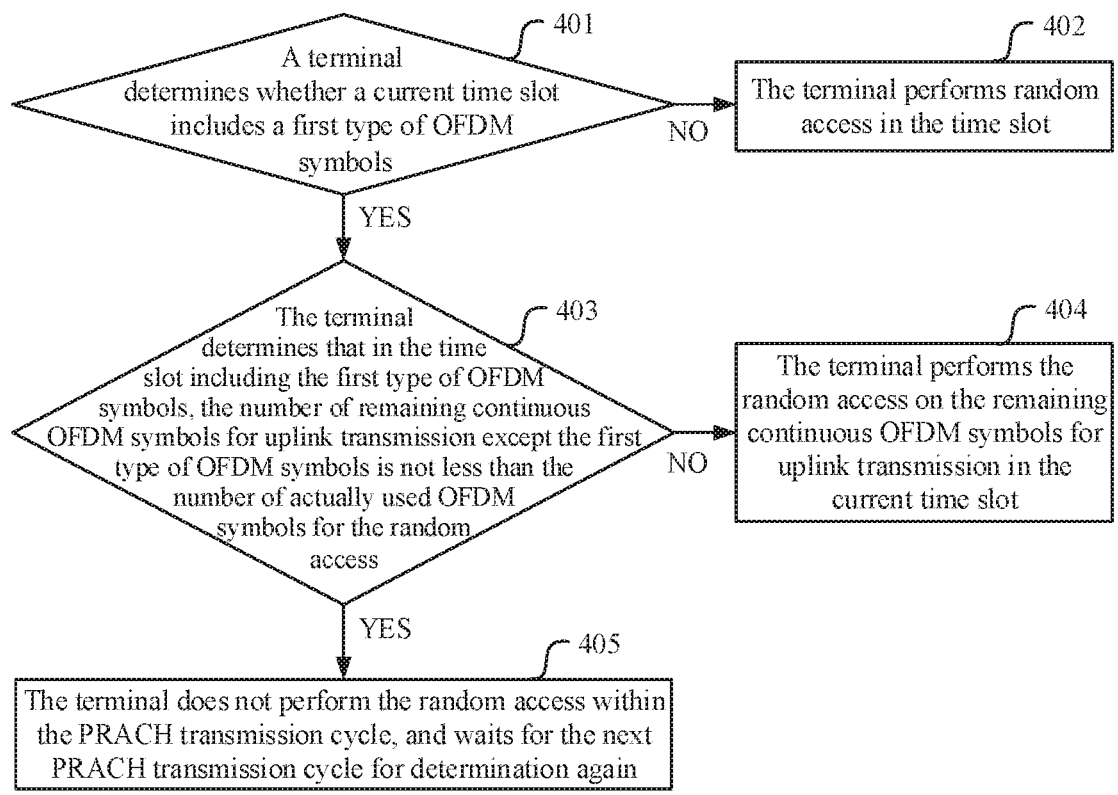
FIG. 4 is a flow chart of determining a random access manner by a first terminal according to the embodiment of the present application.

If the PRACH time domain resource configured by the base station for the terminal includes one time slot, as shown in FIG. 4, the terminal determines the random access manner according to the following steps.

At Step 401: the terminal determines whether the current time slot includes the first type of OFDM symbols; Step 402 is implemented if NO, and Step 403 is implemented if YES.

At Step 402: the terminal performs the random access in the time slot.

At Step 403: the terminal determines whether the number of the remaining continuous OFDM symbols for the uplink transmission except the first type of OFDM symbols in the current time slot is less than the number of the OFDM symbols actually used for random access; Step 404 is implemented if NO, and Step 405 is implemented if YES.

At Step 404: the terminal performs the random access on the remaining continuous OFDM symbols for uplink transmission in the current time slot.

At Step 405: the terminal does not perform the random access within the PRACH transmission cycle, and waits for the next PRACH transmission cycle for determination again.

Figure 5:
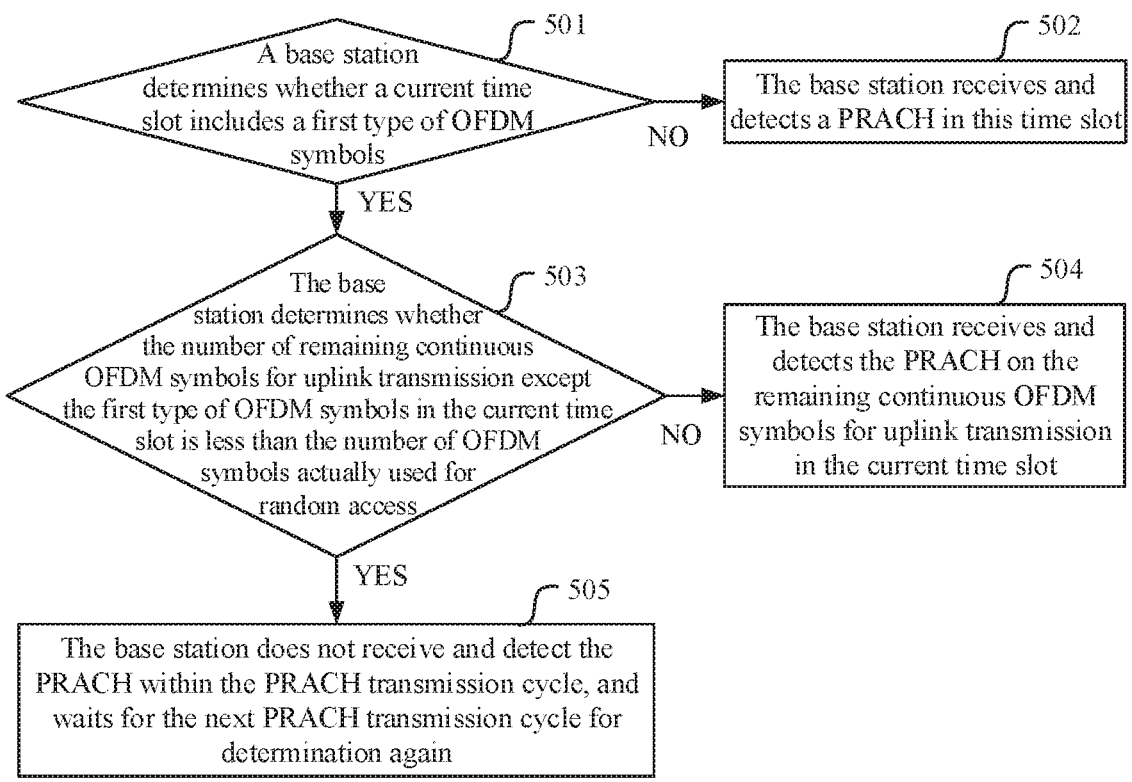
FIG. 5 is a flow chart of determining a random access manner by a first base station according to the embodiment of the present application.

Correspondingly, as shown in FIG. 5, the base station determines the PRACH receiving and detection manner according to the following steps.

At Step 501: the base station determines whether the current time slot includes the first type of OFDM symbols; Step 502 is implemented if NO, and Step 503 is implemented if YES.

At Step 502: the base station receives and detects the PRACH in the time slot.

At Step 503: the base station determines whether the number of the remaining continuous OFDM symbols for the uplink transmission except the first type of OFDM symbols in the current time slot is less than the number of the OFDM symbols actually used for random access; Step 504 is implemented if NO, and Step 505 is implemented if YES.

At Step 504: the base station receives and detects the PRACH on the remaining continuous OFDM symbols for uplink transmission in the current time slot.

At Step 505: the base station does not receive and detect the PRACH within the PRACH transmission cycle, and waits for the next PRACH transmission cycle for determination again.

Figure 6:
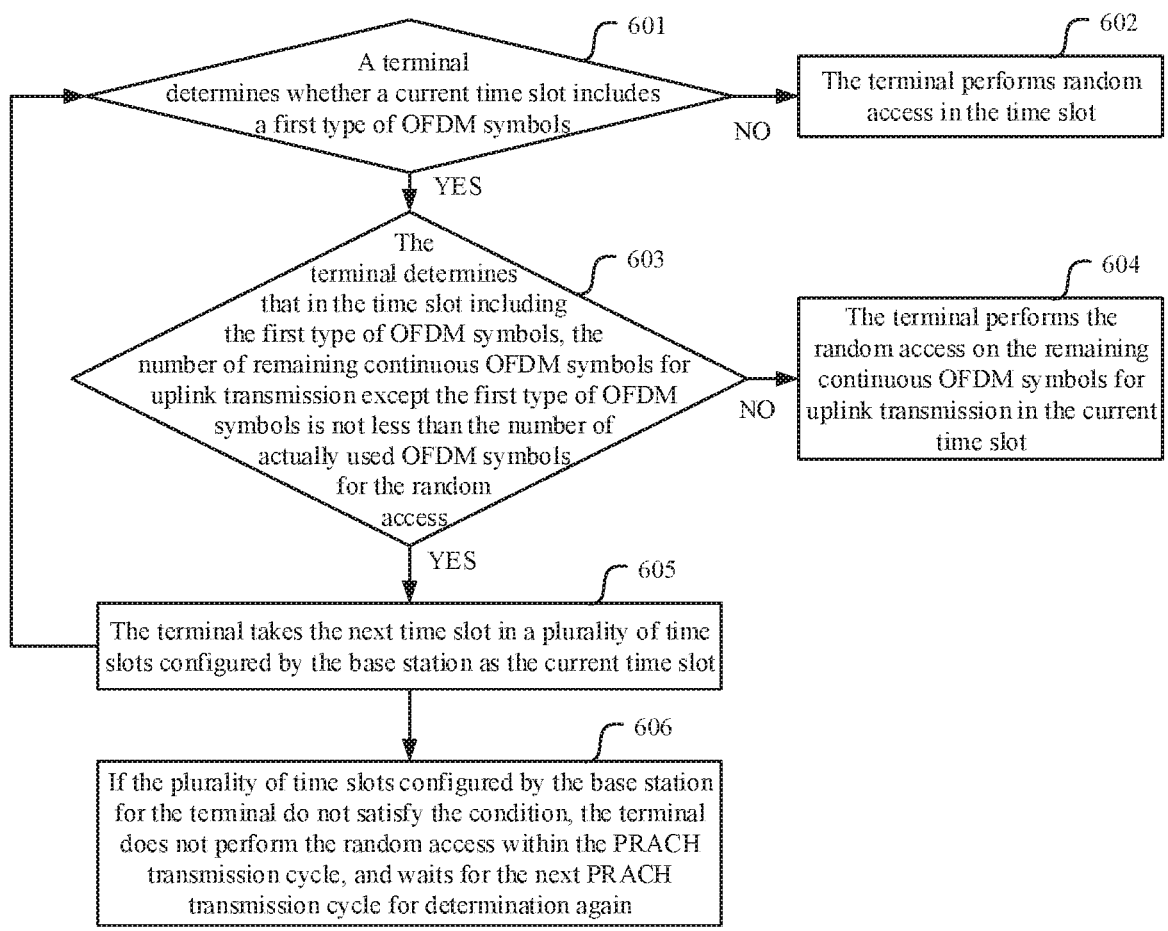
FIG. 6 is a flow chart of determining a random access manner by a second terminal according to the embodiment of the present application.

If the PRACH time domain resource configured by the base station for the terminal includes a plurality of time slots, as shown in FIG. 6, the terminal determines the random access manner according to the following steps.

At Step 601: the terminal determines whether the current time slot includes the first type of OFDM symbols; Step 602 is implemented if NO, and Step 603 is implemented if YES.

At Step 602: the terminal performs the random access in the time slot.

At Step 603: the terminal determines whether the number of the remaining continuous OFDM symbols for the uplink transmission except the first type of OFDM symbols in the current time slot is less than the number of the OFDM symbols actually used for random access; Step 604 is implemented if NO, and Step 605 is implemented if YES.

At Step 604: the terminal performs the random access on the remaining continuous OFDM symbols for uplink transmission in the current time slot.

At Step 605: the terminal takes the next time slot in the plurality of time slots configured by the base station as the current time slot, and returns to Step 601.

At Step 606: if the plurality of time slots configured by the base station for the terminal do not satisfy the condition, the terminal does not perform the random access within the PRACH transmission cycle, and waits for the next PRACH transmission cycle for determination again.

It should be noted that when the PRACH time domain resource configured by the base station for the terminal includes the plurality of time slots, if it is determined that the current time slot does not include the first type of OFDM symbols, the terminal may also make a determination on the next time slot. When the next time slot includes the first type of OFDM symbols, the terminal performs the random access by using the OFDM symbols except the first type of OFDM symbols.

Figure 7:
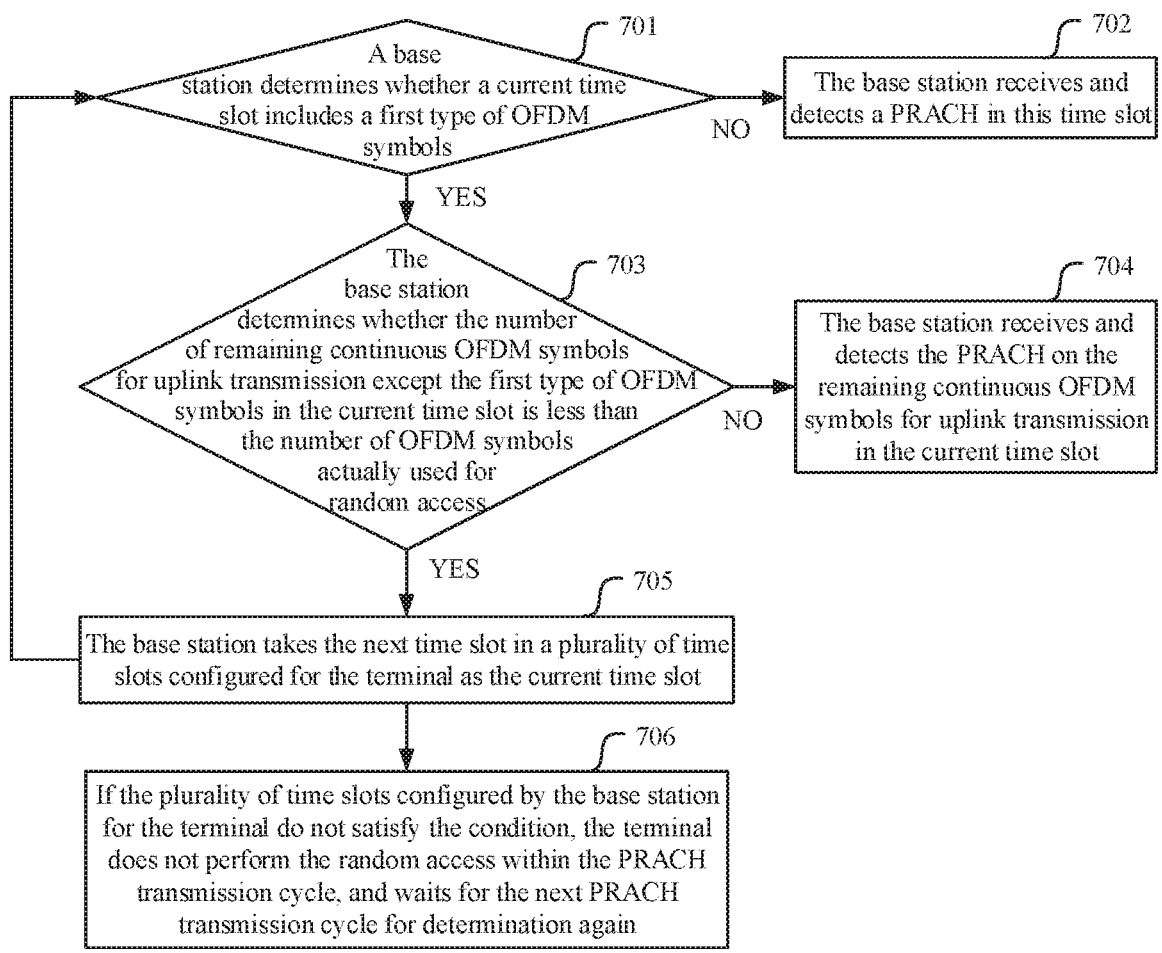
FIG. 7 is a flow chart of determining a random access manner by a second base station according to the embodiment of the present application.

Correspondingly, as shown in FIG. 7, the base station determines the PRACH receiving and detection manner according to the following steps.

At Step 701: the base station determines whether the current time slot includes the first type of OFDM symbols; Step 702 is implemented if NO, and Step 703 is implemented if YES.

At Step 702: the base station receives and detects the PRACH in the time slot.

At Step 703: the base station determines whether the number of remaining continuous OFDM symbols for the uplink transmission except the first type of OFDM symbols in the current time slot is less than the number of OFDM symbols actually used for random access; Step 704 is implemented if NO, and Step 705 is implemented if YES.

At Step 704: the base station receives and detects the PRACH on the remaining continuous OFDM symbols for uplink transmission in the current time slot.

At Step 705: the base station takes the next time slot in the plurality of time slots configured for the terminal as the current time slot, and returns to Step 701.

At Step 706: if the plurality of time slots configured by the base station for the terminal do not satisfy the condition, the base station does not receive and detect the PRACH within the PRACH transmission cycle within the PRACH transmission cycle, and waits for the next PRACH transmission cycle for determination again.

Figure 8:
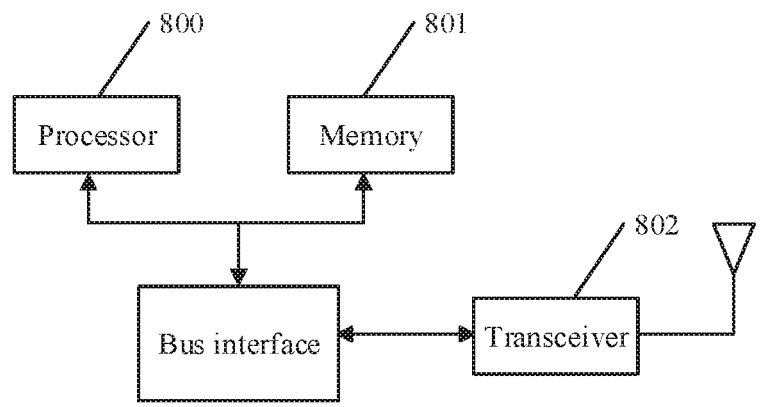
FIG. 8 is a schematic structural diagram of a terminal according to the embodiment of the present application.

As shown in FIG. 8, a first terminal according to an embodiment of the present application includes: a processor 800, a memory 801, a transceiver 802, and a bus interface.

The processor 800 is responsible for managing a bus architecture and performing usual processing, and the memory 801 may store data used when the processor 800 performs operations. The transceiver 802 is configured to receive and transmit data under the control of the processor 800.

The bus architecture may include any number of interconnected buses and bridges to link various circuits of one or more processors represented by the processor 800 and memories represented by the memory 801 together In one embodiment. The bus architecture may also link various other circuits such as peripherals, voltage regulators and power management circuits, which are well known in the art and, therefore, will not be further described herein. A bus interface provides an interface. The processor 800 is responsible for managing the bus architecture and performing usual processing, and the memory 801 may store data used when the processor 800 performs operations.

A flow disclosed by the embodiment of the present application may be applied to the processor 800, or implemented by the processor 800. In the implementation process, each step of a signal processing flow may be completed by integrated logic circuits of hardware in the processor 800 or instructions in the form of software. The processor 800 may be a general-purpose processor, a digital signal processor, an application specific integrated circuit, a field programmable gate array or other programmable logic device, a discrete gate or transistor logic device, and a discrete hardware component, and may implement or execute the various methods, steps and logic block diagrams disclosed in the embodiments of the present application. The general-purpose processor may be a microprocessor or any conventional processor. The steps of the method disclosed in conjunction with the embodiment of the present application may be directly embodied as being implemented by a hardware processor, or may be implemented and completed by a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 801, and the processor 800 reads information in the memory 801 and completes the steps of the signal processing flow in combination with its hardware.

In one embodiment, the processor 800 is configured to read a program in the memory 801 and execute the following actions:

determining a Physical Random Access Channel (PRACH) time domain resource configured by a base station for a terminal, and the PRACH time domain resource includes at least one time slot; and when it is determined that the at least one time slot includes a first type of Orthogonal Frequency Division Multiplexing (OFDM) symbols used for transmitting SS Blocks and/or RMSI, performing random access through an OFDM symbol different from the first type of OFDM symbols in the at least one time slot.

In one embodiment, the processor 800 is In one embodiment configured to:

perform the random access according to any one of the following manners.

Manner I, performing the random access at a time slot which does not include the first type of OFDM symbols.

Manner II, performing the random access through continuous OFDM symbols except the first type of OFDM symbols in the time slot including the first type of OFDM symbols.

In one embodiment, the processor 800 is In one embodiment configured to:

determine a random access manner according to the following manners:

determining the random access manner according to a pre-configured rule; or receiving an indication signaling transmitted by the base station through the RMSI, and determining the random access manner according to the indication signaling.

In one embodiment, the processor 800 is further configured to:

before performing the random access through the continuous OFDM symbols except the first type of OFDM symbols in the time slot including the first type of OFDM symbols, determine that in the time slot including the first type of OFDM symbols, the number of remaining continuous OFDM symbols for uplink transmission except the first type of OFDM symbols is not less than the number of actually used OFDM symbols for the random access.

In one embodiment, the processor 800 is In one embodiment configured to:

determine the number of the remaining continuous OFDM symbols for uplink transmission according to the following manners:

determining a ratio of a Subcarrier Spacing (SCS) of a PRACH configured by the base station to an SCS of an SS Block; and determining a product of the number of remaining continuous OFDM symbols in the time slot including the first type of OFDM symbols and the ratio as the number of the remaining continuous OFDM symbols for uplink transmission.

In one embodiment, the processor 800 is In one embodiment configured to:

select at least one idle OFDM symbol between the first type of OFDM symbols from the time slot including the first type of OFDM symbols, or at least one idle OFDM symbol at the end of the time slot including the first type of OFDM symbols; and perform the random access through the selected OFDM symbol.

Figure 9:
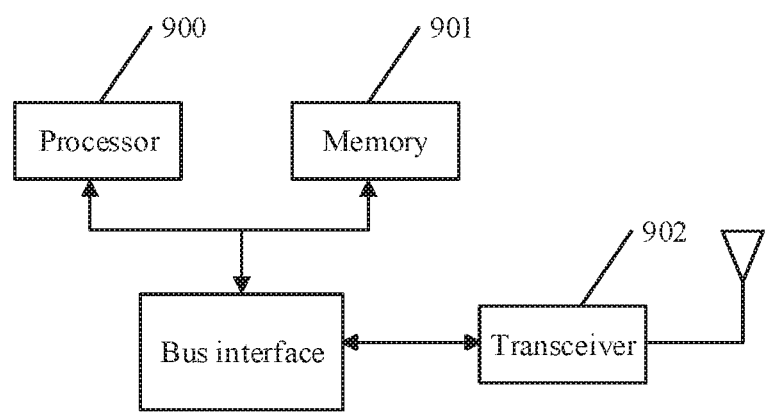
FIG. 9 is a schematic structural diagram of a base station according to the embodiment of the present application.

As shown in FIG. 9, a base station according to an embodiment of the present application includes: a processor 900, a memory 901, a transceiver 902, and a bus interface.

The processor 900 is responsible for managing a bus architecture and performing usual processing, and the memory 901 may store data used when the processor 900 performs operations. The transceiver 902 is configured to receive and transmit data under the control of the processor 900.

The bus architecture may include any number of interconnected buses and bridges to link various circuits of one or more processors represented by the processor 900 and memories represented by the memory 901 together In one embodiment. The bus architecture may also link various other circuits such as peripherals, voltage regulators and power management circuits, which are well known in the art and, therefore, will not be further described herein. A bus interface provides an interface. The processor 900 is responsible for managing the bus architecture and performing usual processing, and the memory 901 may store data used when the processor 900 performs operations.

A flow disclosed by the embodiment of the present application may be applied to the processor 900, or implemented by the processor 900. In the implementation process, each step of a signal processing flow may be completed by integrated logic circuits of hardware in the processor 900 or instructions in the form of software. The processor 900 may be a general-purpose processor, a digital signal processor, an application specific integrated circuit, a field programmable gate array or other programmable logic device, a discrete gate or transistor logic device, and a discrete hardware component, and may implement or execute the various methods, steps and logic block diagrams disclosed in the embodiments of the present application. The general-purpose processor may be a Microprocessor or any conventional processor. The steps of the method disclosed in conjunction with the embodiment of the present application may be directly embodied as being implemented by a hardware processor, or may be implemented and completed by a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 901, and the processor 900 reads information in the memory 901 and completes the steps of the signal processing flow in combination with its hardware.

In one embodiment, the processor 900 is configured to read a program in the memory 901 and execute the following actions:

configuring a Physical Random Access Channel (PRACH) time domain resource for a terminal, and the PRACH time domain resource includes at least one time slot and when it is determined that the at least one time slot includes a first type of Orthogonal Frequency Division Multiplexing (OFDM) symbols used for transmitting SS Blocks and/or RMSI, receiving and detecting the PRACH on an OFDM symbol different from the first type of OFDM symbols in the at least one time slot.

In one embodiment, the processor 900 is In one embodiment configured to:

receive and detect the PRACH according to any one of the following manners.

Manner I, receiving and detecting the PRACH at a time slot which does not include the first type of OFDM symbols.

Manner II, receiving and detecting the PRACH on continuous OFDM symbols except the first type of OFDM symbols in the time slot including the first type of OFDM symbols.

In one embodiment, the processor 900 is further configured to:

before receiving and detecting the PRACH on OFDM symbols except the first type of OFDM symbols in the time slot including the first type of OFDM symbols, determine that in the time slot including the first type of OFDM symbols, the number of remaining continuous OFDM symbols for uplink transmission except the first type of OFDM symbols is not less than the number of actually used OFDM symbols for the random access.

In one embodiment, the processor 900 is In one embodiment configured to:

determine the number of the remaining continuous OFDM symbols for uplink transmission according to the following manners:

determining a ratio of a Subcarrier Spacing (SCS) of a PRACH configured by the base station to an SCS of an SS Block, and determining a product of the number of remaining continuous OFDM symbols in the time slot including the first type of OFDM symbols and the ratio as the number of the remaining continuous OFDM symbols for uplink transmission.

In one embodiment, the processor 900 is In one embodiment configured to:

select at least one idle OFDM symbol between the first type of OFDM symbols from the time slot including the first type of OFDM symbols, or at least one idle OFDM symbol at the end of the time slot including the first type of OFDM symbols; and receive and detect the PRACH on the selected OFDM symbol.

Figure 10:
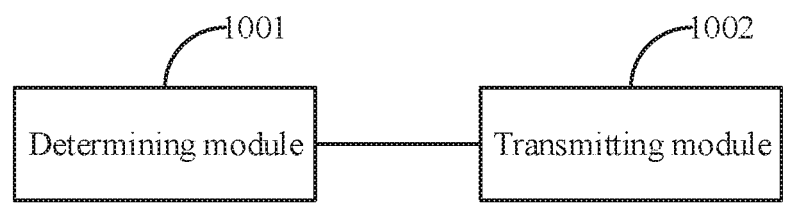
FIG. 10 is a schematic structural diagram of a first random access device according to the embodiment of the present application.

As shown in FIG. 10, a first random access device according to an embodiment of the present application includes:

a determining module 1001 configured to determine a Physical Random Access Channel (PRACH) time domain resource configured by a base station for a terminal, and the PRACH time domain resource includes at least one time slot; and a transmitting module 1002 configured to perform random access through an Orthogonal Frequency Division Multiplexing (OFDM) symbol different from a first type of OFDM symbols in the at least one time slot when it is determined that the at least one time slot includes the first type of OFDM symbols used for transmitting SS Blocks and/or RMSI.

In one embodiment, the transmitting module 1002 is In one embodiment configured to:

perform the random access according to any one of the following manners.

Manner I, performing the random access at a time slot which does not include the first type of OFDM symbols.

Manner II, performing the random access through continuous OFDM symbols except the first type of OFDM symbols in the time slot including the first type of OFDM symbols.

In one embodiment, the transmitting module 1002 is In one embodiment configured to:

determine a random access manner according to the following manners:

determining the random access manner according to a pre-configured rule; or receiving an indication signaling transmitted by the base station through the RMSI, and determining the random access manner according to the indication signaling.

In one embodiment, the transmitting module 1002 is further configured to:

before performing the random access through the continuous OFDM symbols except the first type of OFDM symbols in the time slot including the first type of OFDM symbols, determine that in the time slot including the first type of OFDM symbols, the number of remaining continuous OFDM symbols for uplink transmission except the first type of OFDM symbols is not less than the number of actually used OFDM symbols for the random access.

In one embodiment, the transmitting module 1002 is In one embodiment configured to:

determine the number of the remaining continuous OFDM symbols for uplink transmission according to the following manners:

determining a ratio of a Subcarrier Spacing (SCS) of a PRACH configured by the base station to an SCS of an SS Block; and determining a product of the number of remaining continuous OFDM symbols in the time slot including the first type of OFDM symbols and the ratio as the number of the remaining continuous OFDM symbols for uplink transmission.

In one embodiment, the transmitting module 1002 is In one embodiment configured to:

select at least one idle OFDM symbol between the first type of OFDM symbols from the time slot including the first type of OFDM symbols, or at least one idle OFDM symbol at the end of the time slot including the first type of OFDM symbols; and perform the random access through the selected OFDM symbol.

Figure 11:
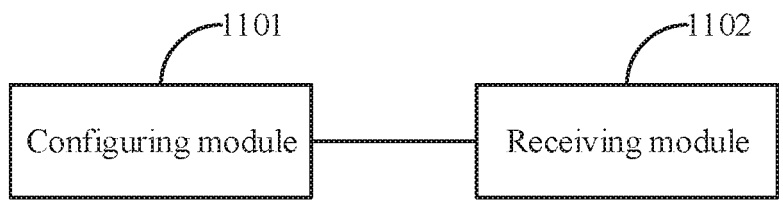
FIG. 11 is a schematic structural diagram of a second random access device according to the embodiment of the present application.

As shown in FIG. 11, a second random access device according to an embodiment of the present application includes:

a configuring module 1101 configured to configure a Physical Random Access Channel (PRACH) time domain resource for a terminal, and the PRACH time domain resource includes at least one time slot; and a receiving module 1102 configured to receive and detect the PRACH on an Orthogonal Frequency Division Multiplexing (OFDM) symbol different from a first type of OFDM symbols in the at least one time slot when it is determined that the at least one time slot includes the first type of OFDM symbols used for transmitting SS Blocks and/or RMSI.

In one embodiment, the receiving module 1102 is In one embodiment configured to:

receive and detect the PRACH according to any one of the following manners:

Manner I, receiving and detecting the PRACH at a time slot which does not include the first type of OFDM symbols.

Manner II, receiving and detecting the PRACH on continuous OFDM symbols except the first type of OFDM symbols in the time slot including the first type of OFDM symbols.

In one embodiment, the receiving module 1102 is further configured to:

before receiving and detecting the PRACH on OFDM symbols except the first type of OFDM symbols in the time slot including the first type of OFDM symbols, determine that in the time slot including the first type of OFDM symbols, the number of remaining continuous OFDM symbols for uplink transmission except the first type of OFDM symbols is not less than the number of actually used OFDM symbols for the random access.

In one embodiment, the receiving module 1102 is In one embodiment configured to:

determine the number of the remaining continuous OFDM symbols for uplink transmission according to the following manners:

determining a ratio of a Subcarrier Spacing (SCS) of a PRACH configured by the base station to an SCS of an SS Block, and determining a product of the number of remaining continuous OFDM symbols in the time slot including the first type of OFDM symbols and the ratio as the number of the remaining continuous OFDM symbols for uplink transmission.

In one embodiment, the receiving module 1102 is In one embodiment configured to:

select at least one idle OFDM symbol between the first type of OFDM symbols from the time slot including the first type of OFDM symbols, or at least one idle OFDM symbol at the end of the time slot including the first type of OFDM symbols; and receive and detect the PRACH on the selected OFDM symbol.

Based on the same inventive concept, an embodiment of the present application further provides a random access method. Since a device corresponding to the method is the terminal in the random access system according to the embodiment of the present application, and the principle of the method for solving the problem is similar to that of the device, the implementation of this method may refer to the implementation of the device, and the repetitions will not be described here.

A computer storage medium according to an embodiment of the present application stores a computer program. The program, when executed by a processor, implements the steps implemented by the terminal of the embodiment of the present application, or the steps implemented by the base station of the embodiment of the present application.

Figure 12:
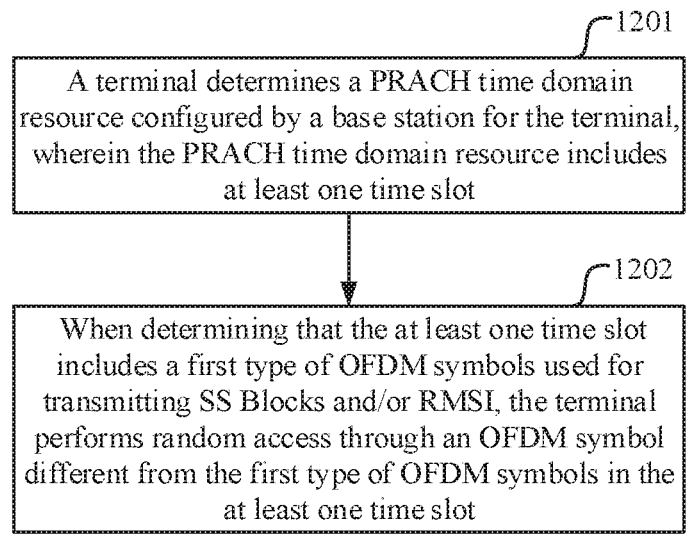
FIG. 12 is a flow chart of a first random access method according to the embodiment of the present application.

As shown in FIG. 12, a first random access method according to an embodiment of the present application includes:

at Step 1201, a terminal determines a Physical Random Access Channel (PRACH) time domain resource configured by a base station for the terminal, and the PRACH time domain resource includes at least one time slot; and at Step 1202, when it is determined that the at least one time slot includes a first type of Orthogonal Frequency Division Multiplexing (OFDM) symbols used for transmitting SS Blocks and/or RMSI, the terminal performs random access through an OFDM symbol different from the first type of OFDM symbols in the at least one time slot.

In one embodiment, the terminal performs the random access according to any one of the following manners.

Manner I, the terminal performs the random access at a time slot which does not include the first type of OFDM symbols.

Manner II, the terminal performs the random access through continuous OFDM symbols except the first type of OFDM symbols in the time slot including the first type of OFDM symbols.

In one embodiment, the terminal determines a random access manner according to the following manners:

the terminal determines the random access manner according to a pre-configured rule; or the terminal receives an indication signaling transmitted by the base station through the RMSI, and determines the random access manner according to the indication signaling.

In one embodiment, before the terminal performs the random access through the continuous OFDM symbols except the first type of OFDM symbols in the time slot including the first type of OFDM symbols, the random access method further includes:

the terminal determines that in the time slot including the first type of OFDM symbols, the number of remaining continuous OFDM symbols for uplink transmission except the first type of OFDM symbols is not less than the number of actually used OFDM symbols for the random access.

In one embodiment, the terminal determines the number of the remaining continuous OFDM symbols for uplink transmission according to the following manners:

the terminal determines a ratio of a Subcarrier Spacing (SCS) of a PRACH configured by the base station to an SCS of an SS Block; and the terminal determines a product of the number of remaining continuous OFDM symbols in the time slot including the first type of OFDM symbols and the ratio as the number of the remaining continuous OFDM symbols for uplink transmission.

In one embodiment, the manner that the terminal performs the random access through the continuous OFDM symbols except the first type of OFDM symbols in the time slot including the first type of OFDM symbols includes:

the terminal selects at least one idle OFDM symbol between the first type of OFDM symbols from the time slot including the first type of OFDM symbols, or at least one idle OFDM symbol at the end of the time slot including the first type of OFDM symbols; and the terminal performs the random access through the selected OFDM symbol.

Based on the same inventive concept, an embodiment of the present application further provides a random access method. Since a device corresponding to the method is the base station in the random access system according to the embodiment of the present application, and the principle of the method for solving the problem is similar to that of the device, the implementation of this method may refer to the implementation of the device, and the repetitions will not be described here.

Figure 13:
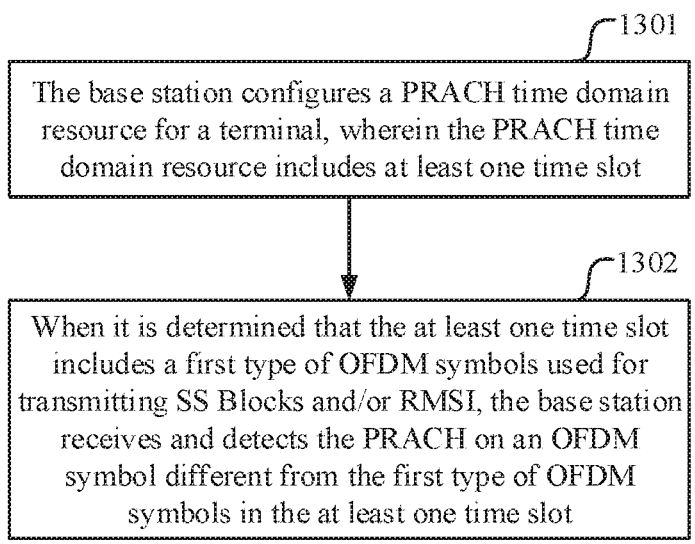
FIG. 13 is a flow chart of a second random access method according to the embodiment of the present application.

As shown in FIG. 13, a second random access method according to an embodiment of the present application includes:

at Step 1301, a base station configures a Physical Random Access Channel (PRACH) time domain resource for a terminal, and the PRACH time domain resource includes at least one time slot; and at Step 1302, when it is determined that the at least one time slot includes a first type of Orthogonal Frequency Division Multiplexing (OFDM) symbols used for transmitting SS Blocks and/or RMSI, the base station receives and detects the PRACH on an OFDM symbol different from the first type of OFDM symbols in the at least one time slot.

In one embodiment, the base station receives and detects the PRACH according to any one of the following manners:

Manner I, the base station receives and detects the PRACH at a time slot which does not include the first type of OFDM symbols; and Manner II, the base station receives and detects the PRACH on continuous OFDM symbols except the first type of OFDM symbols in the time slot including the first type of OFDM symbols.

In one embodiment, before the base station receives and detects the PRACH on the continuous OFDM symbols except the first type of OFDM symbols in the time slot including the first type of OFDM symbols, the random access method further includes:

the base station determines that in the time slot including the first type of OFDM symbols, the number of remaining continuous OFDM symbols for uplink transmission except the first type of OFDM symbols is not less than the number of actually used OFDM symbols for the random access.

In one embodiment, the base station determines the number of the remaining continuous OFDM symbols for uplink transmission according to the following manners:

the base station determines a ratio of a Subcarrier Spacing (SCS) of a PRACH configured for the terminal to an SCS of an SS Block; and the base station determines a product of the number of remaining continuous OFDM symbols in the time slot including the first type of OFDM symbols and the ratio as the number of the remaining continuous OFDM symbols for uplink transmission.

In one embodiment, the manner that the base station receives and detects the PRACH on the continuous OFDM symbols except the first type of OFDM symbols in the time slot including the first type of OFDM symbols includes:

the base station selects at least one idle OFDM symbol between the first type of OFDM symbols from the time slot including the first type of OFDM symbols, or at least one idle OFDM symbol at the end of the time slot including the first type of OFDM symbols; and the base station receives and detects the PRACH on the selected OFDM symbol.

The present application is described above with reference to block diagrams and/or flow charts illustrating methods, apparatuses (systems) and/or computer program products according to the embodiments of the present application. It should be understood that one block of the block diagram and/or flow chart illustration and a combination of blocks of the block diagram and/or flow chart illustration can be implemented by computer program instructions. These computer program instructions may be provided to a general-purpose computer, a processor of a special-purpose computer, and/or other programmable data processing apparatuses to produce a machine the instructions executed via the computer processor and/or other programmable data processing apparatuses are created for a method configured to implement the functions/actions specified in the blocks of the block diagram and/or flow chart.

Correspondingly, the present application can also be implemented in hardware and/or software (including firmware, resident software, microcodes, etc.). Further, the present application may take a form of a computer program product on a computer-usable or computer-readable storage medium, which has a computer-usable or computer-readable program code implemented in the medium to be used by an instruction execution system or used in conjunction with the instruction execution system. In the context of the present application, a computer-usable or computer-readable medium may be any medium that can contain, store, communicate, transmit, or transfer a program for use by an instruction execution system, apparatus, or device, or in conjunction with an instruction execution system, apparatus, or device.

The invention claimed is:

1. A random access method, comprising:
    determining, by a terminal, a Physical Random Access Channel (PRACH) time domain resource configured by a base station for the terminal, wherein the PRACH time domain resource comprises at least one time slot; and
    when it is determined that the at least one time slot comprises a first type of Orthogonal Frequency Division Multiplexing (OFDM) symbols used for transmitting Synchronization Signal Blocks (SS Blocks) and/or Remaining Minimum System Information (RMSI), performing, by the terminal, random access through an OFDM symbol different from the first type of OFDM symbols in the at least one time slot;
    wherein the performing, by the terminal, random access according to any one of following manners:
    Manner I, performing, by the terminal, the random access at a time slot which does not comprise the first type of OFDM symbols; and
    Manner II, performing, by the terminal, the random access through continuous OFDM symbols except the first type of OFDM symbols in the time slot comprising the first type of OFDM symbols;
    wherein before performing, by the terminal, the random access through the continuous OFDM symbols except the first type of OFDM symbols in the time slot comprising the first type of OFDM symbols, the method further comprises:
    determining, by the terminal, that in the time slot comprising the first type of OFDM symbols, a quantity of remaining continuous OFDM symbols for uplink transmission except the first type of OFDM symbols is not less than a quantity of actually used OFDM symbols for the random access;
    wherein the terminal determines the quantity of the remaining continuous OFDM symbols for uplink transmission according to followings:
    determining, by the terminal, a ratio of a Subcarrier Spacing (SCS) of a PRACH configured by the base station to an SCS of an SS Block; and
    determining, by the terminal, a product of the quantity of remaining continuous OFDM symbols in the time slot comprising the first type of OFDM symbols and the ratio as the quantity of the remaining continuous OFDM symbols for uplink transmission.

2. The method according to claim 1, wherein the terminal determines a random access manner according to followings:
    determining, by the terminal, a random access manner according to a pre-configured rule; or
    receiving, by the terminal, an indication signaling transmitted by the base station through the RMSI, and determining a random access manner according to the indication signaling.

3. The method according to claim 1, wherein the performing, by the terminal, the random access through the continuous OFDM symbols except the first type of OFDM symbols in the time slot comprising the first type of OFDM symbols comprises:
    selecting, by the terminal, at least one idle OFDM symbol between the first type of OFDM symbols from the time slot comprising the first type of OFDM symbols, or at least one idle OFDM symbol at end of the time slot comprising the first type of OFDM symbols; and
    performing, by the terminal, the random access through selected OFDM symbol.

4. A random access method, comprising:
    configuring, by a base station, a Physical Random Access Channel (PRACH) time domain resource for a terminal, wherein the PRACH time domain resource comprises at least one time slot; and
    when it is determined that the at least one time slot comprises a first type of Orthogonal Frequency Division Multiplexing (OFDM) symbols used for transmitting Synchronization Signal Blocks (SS Blocks) and/or Remaining Minimum System Information (RMSI), receiving and detecting, by the base station, the PRACH on an OFDM symbol different from the first type of OFDM symbols in the at least one time slot;

wherein the receiving and detecting, by the base station, the PRACH according to any one of following manners:

Manner I, receiving and detecting, by the base station, the PRACH at a time slot which does not comprise the first type of OFDM symbols; and Manner II, receiving and detecting, by the base station, the PRACH on continuous OFDM symbols except the first type of OFDM symbols in the time slot comprising the first type of OFDM symbols;

wherein before the receiving and detecting, by the base station, the PRACH on the continuous OFDM symbols except the first type of OFDM symbols in the time slot comprising the first type of OFDM symbols, the method further comprises:

determining, by the base station, that in the time slot comprising the first type of OFDM symbols, a quantity of remaining continuous OFDM symbols for uplink transmission except the first type of OFDM symbols is not less than a quantity of actually used OFDM symbols for random access;

wherein the base station determines a quantity of the remaining continuous OFDM symbols for uplink transmission according to followings:

determining, by the base station, a ratio of a Subcarrier Spacing (SCS) of a PRACH configured for the terminal to an SCS of an SS Block; and determining, by the base station, a product of the quantity of remaining continuous OFDM symbols in the time slot comprising the first type of OFDM symbols and the ratio as the quantity of the remaining continuous OFDM symbols for uplink transmission.

5. The method according to claim 4, wherein the receiving and detecting, by the base station, the PRACH on the continuous OFDM symbols except the first type of OFDM symbols in the time slot comprising the first type of OFDM symbols comprises:

selecting, by the base station, at least one idle OFDM symbol between the first type of OFDM symbols from the time slot comprising the first type of OFDM symbols, or at least one idle OFDM symbol at end of the time slot comprising the first type of OFDM symbols; and receiving and detecting, by the base station, the PRACH on selected OFDM symbol.

6. A terminal, comprising: a processor, a memory, and a transceiver, wherein the processor is configured to read a program in the memory to perform followings:

determining a Physical Random Access Channel (PRACH) time domain resource configured by a base station for the terminal, wherein the PRACH time domain resource comprises at least one time slot; and when it is determined that the at least one time slot comprises a first type of Orthogonal Frequency Division Multiplexing (OFDM) symbols used for transmitting Synchronization Signal Blocks (SS Blocks) and/or Remaining Minimum System Information (RMSI), performing random access through an OFDM symbol different from the first type of OFDM symbols in the at least one time slot;

wherein the processor is configured to perform the random access according to any one of following manners:

Manner I, performing the random access at a time slot which does not comprise the first type of OFDM symbols; and Manner II, performing the random access through continuous OFDM symbols except the first type of OFDM symbols in the time slot comprising the first type of OFDM symbols;

wherein the processor is further configured to:

before performing the random access through the continuous OFDM symbols except the first type of OFDM symbols in the time slot comprising the first type of OFDM symbols, determine that in the time slot comprising the first type of OFDM symbols, a quantity of remaining continuous OFDM symbols for uplink transmission except the first type of OFDM symbols is not less than a quantity of actually used OFDM symbols for the random access;

wherein the processor is configured to determine the quantity of the remaining continuous OFDM symbols for uplink transmission according to followings:

determining a ratio of a Subcarrier Spacing (SCS) of a PRACH configured by the base station to an SCS of an SS Block; and determining a product of the quantity of remaining continuous OFDM symbols in the time slot comprising the first type of OFDM symbols and the ratio as the quantity of the remaining continuous OFDM symbols for uplink transmission.

7. The terminal according to claim 6, wherein the processor is configured to determine a random access manner according to followings:

determining the random access manner according to a pre-configured rule; or receiving an indication signaling transmitted by the base station through the RMSI, and determining the random access manner according to the indication signaling.

8. The terminal according to claim 6, wherein the processor is configured to:

select at least one idle OFDM symbol between the first type of OFDM symbols from the time slot comprising the first type of OFDM symbols, or at least one idle OFDM symbol at the end of the time slot comprising the first type of OFDM symbols; and perform the random access through selected OFDM symbol.

9. A base station, comprising: a processor, a memory, and a transceiver, wherein the processor is configured to read a program in the memory to perform the method according to claim 4.

10. The base station according to claim 9, wherein the processor is configured to:

select at least one idle OFDM symbol between the first type of OFDM symbols from the time slot comprising the first type of OFDM symbols, or at least one idle OFDM symbol at end of the time slot comprising the first type of OFDM symbols; and receive and detect the PRACH on selected OFDM symbol.

* * * * *